United States Patent Office 3,565,748
Patented Feb. 23, 1971

3,565,748
MULTILAYERED DECK STRUCTURE CONTAINING AN ELASTOMERIC POLYEPOXIDE RESIN COMPOSITION
Stephen T. Palmer, Worcester, Stephen T. Palmer, Jr., Lansdale, and Daniel S. Morse, Swarthmore, Pa., assignors to Palmer Products Incorporated, Worcester, Pa., a corporation of Pennsylvania
No Drawing. Continuation-in-part of abandoned application Ser. No. 131,107, Aug. 14, 1961. This application Mar. 22, 1967, Ser. No. 625,029
Int. Cl. B32b 27/38
U.S. Cl. 161—184     11 Claims

ABSTRACT OF THE DISCLOSURE

A multilayer deck structure and method for making the same is disclosed, said deck structure comprising an upper wooden deck and an underlying steel supporting deck secured by an intermediate layer comprising an elastomeric resin containing a polyepoxide, a chloroprene, a plasticizer and a hardening agent.

RELATED APPLICATION

This application is a continuation-in-part of the copending application Ser. No. 131,107, filed Aug. 14, 1961, now abandoned.

Field of the invention

Pertains to polyepoxide, chloroprene pourable viscous liquid phase compositions containing a relatively non-volatile plasticizer which under ambient conditions chemically react with a phase change to a solid elastomeric resin.

Description of the prior art

Resins formed by reacting, (cross-linking) an epoxy-compound with a chloroprene in the presence of a hardening agent are known, cf: Thomas F. Mika, (Jour. App. Chem. 6, September 1956, pages 369–370). Mika states that epoxide resins are, "potentially reactive with chloroprene polymers, Neoprenes . . ." and beyond that states there "physical properties in general were inferior to commercially developed formulations of Neoprenes . . ." Edmund J. Yaroch, U.S. Pat. 3,124,548 of Mar. 10, 1964— CIP of application filed Feb. 7, 1957, makes films from casting formulations containing epoxy and chloroprene dissolved in volatile solvents.

SUMMARY

Elastomeric materials of the art collateral with those of the class described, have deficiences principally stemming from their failure to withstand flexure without embrittlement, to maintain dimensional stability while retaining physical properties and to resist for an extended period of time, severe weathering. Oakum, and like calking materials such as cotton twist or wicking are driven into seams between the planks, ship decks, hulls and the like, to prevent leaking. The calking has been universally completed by paying the seams with melted pitch which all too promptly breaks away hence requiring frequent replacement. Tar, pitch and other sealing compositions found in the art, with or without fillers, are unconscionably short lived especially when used on decks that carry heavy cargo or are subject to jet bomber landings and like severe impacts. Moreover, attempts to replace traditional sealers with natural and synthetic elastomers such as rubber, polymeric compounds and their equivalents have been generally unsatisfactory due to the difficulty encountered in their fabrication, lack of adhesion and to the impracticability of curing in place to give sought for durability under severe weathering and heavy traffic. Furthermore, prior art related resins of the class described when molded or otherwise formed by conventional means fail to retain the aforesaid characteristics to the degree required by modern technology.

The composition of the invention is so formulated that it distinguishes from prior art compositions in having, in the liquid phase state, a pourable viscosity and likewise possesses an exceptionally long useful life in that state. The composition sets from the liquid to the solid state with substantially no appreciable volume change between the states. Moreover, in contrast with such elastomers as Thiokol and the polyurethanes, the elastomeric resins of the invention do not require the use of a primer and they set bubble free and without swelling.

An object of the invention is to provide synthetic elastomeric compositions and their use for casting, molding, sealing, filling, potting, embedding, calking and the like. Other objects of the invention include; the provisions of a pourable composition of polymeric substances which react chemically to give, in situ, elastomeric, tough, water impermeable void-free and bubble-free castings with exceptionally low shrinkage and lasting adhesion; processes for preparing pourable compositions that set at ambient temperature without superimposed pressure; uses for such elastomers; a transportably stable, multipart composition which after mixing can be injected into a confined space and set in situ; an ambient temperature heat setting elastomeric composition containing a chloroprene polymer, a polyepoxide resin and a hardening agent; and elastomers resulting from chemical reactions between a chloroprene polymer, a polyepoxide and a cross-linking agent. Other objects and advantages of the invention will appear hereinafter.

The above and other objects of the invention emanated from a demand for a tough, durable, water impermeable elastomeric substance that could be economically placed in confined spaces and, as a case in point, between the upper wooden deck and the underlying steel supporting deck of aircraft carriers. Self curing, chemically resistant, reaction products of the invention were discovered that fulfilled these demands and moreover, these products were found to have other analogous uses. They are prepared by cross-linking (and/or hardening and/or curing), a composition containing a chloroprene polymer and a polyepoxide. In order to facilitate the introduction of these components into the confining spaces they are liquified prior to application, if they are not per se liquids. The chloroprene polymer and the polyepoxide are physically modified by plasticizing and/or liquefing in a suitable liquid and/or plasticizer, which is used in sufficient amounts to permit either pouring, pumping, injecting or otherwise introducing the components of the product into the confined (reaction) space.

One feature of the invention found to be a convenient and acceptable manner of commercialization, is to prepare the components of the final elastomeric product in three separate parts. This method is used to insure that the involved reaction that takes place between the components, largely takes place in the confined (reaction) space. The first part contains a chloroprene polymer in a compatible liquefier and/or plasticizer for the polymer, the additive being present in such amounts that a flowable liquid is formed. The second part contains a polyepoxide in a solvent and/or plasticizer therefor, that ingredient being present in such amounts that a flowable liquid is formed. The third part is made up of a hardener and/or cross linking agent for the polymers, present in sufficient amounts to convert the components of parts one and two to an elastomeric state. The three parts are mixed together prior to use and the resulting pourable composite mixture introduced into the enclosed space. At ambient temperature and at normal pressures, although higher pressures may be used if desired, a multi-chemical reaction takes place in the composite mixture at a rate in conformity with the temperature which usually is between 50° F. and 90° F., although the set is more rapid at higher temperature. At normal temperature a tough, contiguous void-free solid elastomer is formed having exceptionally low shrinkage, which completely fills the confining space and its adjacent interstices and which retains its toughness and adhesion when subjected to temperatures of −30° F. to 200° F.

The invention may likewise be practiced by preparing the composite mixture at (1) the locus of use or (2) sufficiently close to the locus of use to avoid any substantial set of the mixture prior to application that would restrict the manner of introducing the mixture into a confined space. For preparation at locus (1), for example, the chloroprene polymer, polyepoxide, liquefier (and/or plasticizer) and hardener are mixed to give a flowable solution in the order of 10,000 to 150,000 cps. and preferably 19,000 to 25,000 cps., (Brookfield, as more fully described below). The mixing is carried out at a temperature of about 120 to about 180° F. and when a homogenous liquid is obtained its temperature is reduced to normal temperature for use. For preparation at locus (2), for example, the polymers (and/or plasticizers) are thoroughly mixed to give a solution having the viscosity just mentioned and within a period of an hour or less, prior to use, the hardener is added, mixed into the solution and the composite mixture disposed in place. If the three part method of use is employed, parts one and two are each made up with the aforesaid viscosities and part three added directly without solution or, if desired, dissolved in a high boiling solvent to permit ready mixing with parts one and two.

It has been found in accordance with the invention that any thickening of the composite mixture or of an intermediate mixture e.g. the mixture for locus (2) should be restricted to a minimum of 10,000 cps., (Brookfield). The thickening is the result of the chemical reactions that are deemed to take place between the polymers and the polyepoxide and the hardener and between the chloroprene polymer-polyepoxide, reaction product and the hardener. Although the setting of polyepoxide resins is known and I. F. MIKA in J. Appl. Chem. 6, September 1956 pp. 365–375 has noted that the "chloroprene polymers, neoprenes," are potentially reactive with the epoxide resins in the presence of diamines and polyphenols, the prior art neither teaches that from the composite mixture above described, tough water impermeable elastomers can be produced nor that such elastomeric compounds can be produced in the presence of water.

The examples which follow are submitted to illustrate and not to limit the invention.

EXAMPLE 1

Three separate parts of a final composite mixture are first formulated.

Part I is prepared by mixing with adequate agitation 30 parts by weight of tri (2-ethylhexyl) phosphate in a jacketed kettle and at a temperature of about 160° F. with 30 parts by weight of a low molecular weight (viscosity below 800,000 cps. at 122° F. (Brookfield), chloroprene polymer (Neoprene F3), the polymer having been previously cut into 1 inch cubes. When a homogenous solution is obtained which requires about one hour with agitation, the solution has a viscosity (Brookfield) of approximately 10,000 cps. at 67F using a #4 spindle at 10 r.p.m. to 150,000 cps. using a #7 spindle at 20 r.p.m. and on the same basis preferably 19,000 to 25,000. The solution is then canned and held at a temperature below 50° F. until mixed with parts II and III just prior to use.

Part II is prepared by dissolving a polyepichlorohydrin bis phenol reaction product in a hydrocarbon distillate having a boiling point above 250° F. to give an 80% solution. The polyepoxide may be prepared by any suitable method such, for example, as by heating a mixture of bis-(4-hydroxyphenyl)-2,2-propane with a molal excess of epichlorohydrin in the presence of a 10% aqueous solution of sodium hydroxide to give a polyepoxide having a 1,2-epoxy equivalent.

Part III is an amine hardener and cross-linking agent, 2,4,6-tri-(diethylaminomethyl) phenol.

Prior to use, parts I and II are mixed to give a product containing 30 parts by weight of the chloroprene polymer with 30 parts by weight of the polyepoxide and the hardener is added to the extent of 7 parts by weight per 100 parts of the composition.

A solution prepared by a process similar to that of Example 1 was used for calking the wooden deck of an aircraft carrier. Three days after paying the seams the deck was put to normal use. The seams upon a subsequent extensive investigation were found to be fat with the elastomer which was tough, elastic, void-free, bubble-free, crack-free, and firmly bonded to the sides of the seams (without the necessity of a bonding coat invariably required when prior art elastomers are used), after many months weathering and hard usage.

EXAMPLE II

Three compositions were prepared, the first contained 41 parts of a chloroprene polymer (Neoprine FD) and 23 parts of tri (2-ethylhexyl) phosphate; the second, contained 25 parts of epichlor-hydrin-bisphenol reaction product (Epoxy 2774) and 6 parts of a hydrocarbon distillate having a boiling point above 250° F. (Sundex 53); the third, 5 parts of 2,4,6-tri (dimethylamino methyl) phenol (DMP–30). All parts are by weight. The three parts were thoroughly mixed together and applied to the seams of a wooden deck. After hardening a tough elastomeric, water impermeable, void-free elastomer was obtained which shows no perceptible shrinkage.

EXAMPLE III

An elastomer was prepared by setting at ambient temperature a composition containing by weight 39 parts of a chloroprene polymer (Neoprene FD), 19.5 parts of a chlorinated paraffin (Hallowax 4004), 34 parts of a polyepoxide (Epoxy 2255) and 7.5 parts of a hydrocarbon distillate having a boiling point above 250° F. This composition is settable in the presence of salt water. When disposed in an enclosed space the composition sets to a durable, tough, non-tacky elastomer at normal temperatures and pressures.

EXAMPLE IV

The following compositions were prepared by the three part method, the three parts were combined to form a composite and homogeneous pourable liquid. Upon application each composition resulted, after hardening, in an elastomeric product having excellent adhesion and retention of initial superior elastomeric properties even after severe weathering and hard usage.

| Composition | A | B | C | D | E | F |
|---|---|---|---|---|---|---|
| Chloroprene polymer: | | | | | | |
| (1) | 33 | 35 | | | 35.8 | |
| (2) | | | 38 | 27 | | 27 |
| Plasticizer: | | | | | | |
| (3) | 27.4 | 28 | | | 27.4 | 21.6 |
| (4) | | | 34 | | | |
| (5) | | | | 27.5 | | |
| Polyepoxide: | | | | | | |
| (6) | | 24 | 19 | | | 23.0 |
| (7) | 28.0 | | | 40 | 24.5 | |
| Liquefier: (8) | 5.4 | 7 | 5 | | 6.6 | 5.4 |
| Hardener: | | | | | | |
| (9) | 6.2 | 6 | | | 5.7 | |
| (10) | | | | 4 | | |
| (11) | | | | | 5.5 | |
| (12) | | | | | | 23.0 |
| | 100.0 | 100 | 100 | 100.0 | 100.0 | 100.0 |

NOTES:
(1) Intermediate MW chloroprene polymer 800,000 to 1,200,000 cps. at 122° F. (Brookfield).
(2) Low MW chloroprene polymer 400,000 ot 600,000 cps. at 122° F. (Brookfield).
(3) Tri(2-ethylhexyl) phosphate.
(4) Dibutyl phthalate.
(5) Di-2-ethyl hexyl adipate.
(6) Epichlorhydrin bisphenol reaction product.
(7) Glycidyl polyether of polyhydric phenols.
(8) Hydrocarbon distillate, B.P. at least 250° F.
(9) 2,4,6, tri (dimethyl aminomethyl) phenol.
(10) Triethylene triamine.
(11) Dimethylaminomethyl phenol.
(12) A polyamide hardener (Versamid—Glen Mills).

The chloroprene polymers of the invention are made by the polymerization of the halogated dienes and more particularly by the polymerization of 2-chloro-1,3-butadiene, which is itself made by the action of hydrogen chloride on monovinyl acetylene. The polymers of the chloroprenes are also known as Neoprene. Chemically modified chloroprene polymers may also be used in the present invention, including e.g. copolymers of the chloroprenes with compounds containing an active $CH_2=C<$ group, examples of which compounds include acrylonitrile, the alkyl acrylates and alkacrylates, more particularly methyl acrylate and methyl methacrylate and the higher alkyl acrylates; styrenes and the substituted styrenes; the conjugated dienes such as isoprene, piperylene, methyl pentadiene, and the like.

Chloroprene polymers having a wide molecular weight range may be used. Preferably, however, the relatively low molecular weight polymers of this class are used in order to facilitate liquifying them to the desired viscosity already mentioned. Pourable compositions, from which tough durable elastomers are formed, are made by the use of chloroprene polymers having molecular weights and cps. ranging from 400,000 to 1,500,000 at 122° F. (Brookfield), the preferred polymers of this class having cps. between 400,000 and 800,000 at 122° F. (Brookfield).

The epoxides used in the compositions of the invention are identified by the presence of at least one cyclic ether group, namely one in which an ether oxygen atom is attached to two adjacent carbon atoms thereby forming a cyclic structure. Polyepoxides and the term epoxy polymers signify compositions in which one or more epoxy groups, i.e. the above described cyclic ether groups are present. The polyepoxide resins used by the process of the invention may be saturated or unsaturated, aliphatic, cycloaliphatic, aromatic or heterocyclic and preferably substituted with substituents, such as chlorine atoms, hydroxyl groups, ether radicals and the like. Suitable polyepoxides can be prepared by the well known processes described in the art. They can be bought on the open market. (#828 Epon—Shell; #2772 and #2774), these are all liquid bisphenol A type resins which may vary somewhat in viscosity.

Certain agents hereinafter referred to as hardening agents are added to the polymers to convert them chemically from their fluid state to a tough contiguous elastomeric state. Agents which are known and used for hardening, setting, cross-linking, and/or curing epoxy compounds and their polymers are used, particularly those agents that react with the functional groups of the epoxy polymers, that effect the hardening reaction at low temperatures between, for example, 50° F. and 150° F. and preferably at temperatures below 75° F., and more especially those which react with halogen, hydroxy, and epoxy groups. Examples of these agents include: the amino compounds such as diethylene triamine, triethylene tetraamine, diethanol amine, ethylene tetramine, pyridine, triethanol amine, 2,4-diamino-2,6-dimethyloctane, dimethylaminomethyl phenol, 2,4,6-tri(dimethyl aminomethyl) phenol and such compounds as stannous octoate and their known equivalents. The polyamide hardeners may also be used (e.g. the Versimides, Genamides, etc. of General Mills). These hardening agents are used generally in amounts ranging from 5% to 150% by weight of the polyepoxide used in the composition.

A wide range of liquifying agents can be used in the preparation of the polymer liquids. The principal functions of the liquifying agents are to facilitate subsequent use of the composite composition in calking, casting, sealing, molding and the like, and also to promote by proximate contact the speed of the chemical reactions between polymers of the chloroprene and the polyepoxides with the hardening agent or agents and also the reactions between the co-polymers formed between the chloroprene and the epoxide and the hardening agent or agents. If the composite composition is prepared at locus (1) referred to above, the chloroprene and the polyepoxide used are mixed in a liquid that will provide a homogeneous readily flowable viscosity preferably between 10,000 to 25,000 at 25° C. (Brookfield). Suitable liquefying agents for this purpose include, for example: the dialkyl dicarboxylic acids e.g. the dialkyl ester of malonic, succinic, glutaric, adipic, suberic, sebacic acids, such as the dibutyl, dipropyl and higher alkyl esters of these acids; dibutyl phthalate, butyl laurate, di-butyl glycolate, di-2-ethyl hexyl adipate, glycerol tributyrate, butyl glyceral ether, triethylene glycol di-2 ethyl hexoate, normally liquid petroleum hydrocarbons, cumar, the chloronated paraffins (e.g. Halowax 4104), the polyalkyl, alkoxyalkyl phosphates such as tributoxyethyl phosphate, tri(2-ethyl-hexyl) phosphate, and related symmetrical and unsymmetrical alkyl and alkoxyalkyl esters of the phosphoric acids that have boiling points above 250° F. If liquid polyepoxides are used they are modified, if at all, only to the extent necessary to adjust their fluidity to the desired degree. When the three parts are separately made up, part one and two may be made with the same or with dissimilar liquefiers with the provision that if dissimilar liquids are used they are compatible and will give a homogeneous liquid with the polymers when mixed.

The liquefying agents perform a two fold function i.e. they are present to convert the more or less non-liquid polymers to pourable liquids and also to plasticize the elastomer after the setting of the polymers. The first and second part of the three part mixture, accordingly should contain a sufficient amount of the liquefying agent to give a flowable viscosity i.e. between the range specified above. Moreover, the total amount of liquefier used should be such that the elastomeric product contains in the order of 15 to 50 percent by weight of a plasticizer. For this reason if a liquefier is used for one of the polymers, the requisite amount of plasticizer should either be added to the other polymer or part of the plasticizer added to the other polymer and the remainder introduced directly into the composition prior to application and subsequent hardening. Any other suitable method of introducing the liquifier and plasticizer can be used.

It has furthermore been determined that the polymer content of the composite composition should be, based on 100 parts by weight of the chloroprene polymer, from 50 to 150 parts by weight of the polyepoxide, and more particularly from 85 to 115 parts of the polyepoxide. Fillers, thixotropic agents, anti-oxidants, colors and the like may also be introduced into the composition to modify the wearing qualities, the consistency of the intermediate compositions and the elastomeric product.

Elastomers produced in accordance with the invention have these superior characteristics properties; they are produced with negligible exothermicity and in a solid contiguous state that is substantially free from voids, and are flame retardant, weather and chemical resistant with a minimum of shrinkage. When the elastomer is cast against metal, wood, ceramics, etc. excellent adhesion develops without the need of a primer.

The composite composition of the invention has been used for calking the seams of wooden decks, and as a sealing substratum in the shallow space between the wooden deck and the steel underdeck of aircraft carriers. In such uses, the three parts are placed in a drum and mixed with a power mixer. In calking, the thoroughly mixed composition is then poured in to the seams and allowed to set to a tough rubbery solid which develops excellent adhesion to the sides of the seams.

For a sealing substratum, the wooden deck of the area to be sealed has in some installations been first drilled with one inch holes at two foot intervals. An ordinary grease gun is used for the pumping operation. The outlet fitting is screwed into the first hole and the mixed liquid pumped in until it rises in adjacent holes. The fitting is then removed, the hole filled with a wooden plug, and the pumping operation moved to another hole. By progressing in this manner the width and length of the deck to be sealed, the area is, after setting of the polymers completely undersealed with a solid water-proof blanket without the heretofore required expensive removal and replacement of the wood. Excellent adhesion is achieved to both the wood and the steel, the tough elastomer remaining in place during the pounding blows of landing planes and retaining elasticity for suprisingly long periods of exposure to the sea and weather.

Outstanding features of the composition and its application are their ability to force any water, fresh or salt, or oil lying between the wood and the steel, out of the adjacent holes, and the setting of the composition from a liquid to a solid in the presence of water and/or oil that has not been ejected. The ability of the composition to set or cure under water extends its utility to a wide variety of uses in which calking, sealing and analogous operations are carried out in the presence of water.

The physical properties, listed below, of an elastomer produced in accordance with the invention were measured on a composite composition hardened in an inclosed space, prepared in the size specimens prescribed by ASTM methods, and the properties determined as directed.

|  | Tensile strength in p.s.i. | Elongation, percent | Durometer hardness |
| --- | --- | --- | --- |
| Seven days at: |  |  |  |
| 73 F | 900 | 225 | 55 |
| 150 F | 800 | 104 | 60 |
| 212 F | 790 | 83 | 70 |

NOTE.—Methods: specific gravity—ASTM E12-27; tensile strength and—elongation ASTM F412-61T; durometer hardness—ASTM D676-49T.

The elastomers of the invention have tensile strength between 700 and 1,200 p.s.i., elongation between 50 and 250% and Durometer hardness between 20 and 85.

In addition to the examples described above, applicants provide the following examples to illustrate without limiting the compositions of the invention. In these examples parts are by weight unless otherwise stated:

|  | G | H | I | J | K | L |
| --- | --- | --- | --- | --- | --- | --- |
| Chloroprene polymer: |  |  |  |  |  |  |
| (1) | 32.8 | 32.8 | 32.10 | 35.00 | 37.40 | 38.80 |
| Plasticizer: |  |  |  |  |  |  |
| (3) | 26.25 | 26.25 |  | 27.90 | 29.83 | 30.98 |
| (X) |  |  |  | 7.95 | 7.37 | 7.65 |
| Polyepoxide: |  |  |  |  |  |  |
| (6) | 28.20 | 28.20 | 22.10 | 7.95 | 18.40 | 15.10 |
| (7) | 6.55 |  |  |  |  |  |
| (Y) |  |  | 5.52 |  |  |  |
| Liquefier: (8) |  | 6.55 | 34.18 |  |  |  |
| Hardener: (9) | 6.20 | 6.20 | 6.10 | 5.30 | 6.08 | 6.31 |
| Filler: (Z) |  |  |  |  | .92 | .96 |
|  | 100.00 | 100.00 | 100.00 | 100.00 | 100.00 | 100.00 |

NOTE.—See Column 5 for the names of the compounds designated by numerals. Those designated by letters are:
X. Natural phenol containing anacardic acid and cardol.
Y. Alkyl glycidyl ether.
Z. Filler—carbon black.

PHYSICAL PROPERTIES OF COMPOUNDS G–L

|  | G | H | I | J | K | L |
| --- | --- | --- | --- | --- | --- | --- |
| Room temperature: |  |  |  |  |  |  |
| Tensile (p.s.i.) | 872 | 895 | 665 | 406 | 243 | 135 |
| Elongation | 258 | 225 | 300 | 333 | 292 | 400 |
| Hardness (durometer) | 63 | 55 | 40 | 36 | 38 | 22 |
| 158 F.: |  |  |  |  |  |  |
| Tensile (p.s.i.) | 1,100 | 801 | 550 | 468 | 328 | 320 |
| Elongation | 87.5 | 104 | 145 | 187 | 162.5 | 366 |
| Hardness (durometer) | 76 | 60 | 48 | 47 | 45 | 26 |
| 212 F.: |  |  |  |  |  |  |
| Tensile (p.s.i.) | 1,300 | 788 | 495 | 286 | 160 | 90 |
| Elongation | 83 | 83 | 100 | 117 | 125 | 290 |
| Hardness (durometer) | 82 | 70 | 60 | 50 | 47 | 28 |

The tensile strength, elongation and hardness described in the table of Physical Properties were measured by the ASTM methods identified in column 7. It will be noted that the tensile strengths of the elastomeric resin G, increase with increase in temperature. This is unexpected as is also the increase in durometer hardness with temperature of all resins G through L. This is in contrast with commonly used materials of construction. This unique property of resin G has marked utility in those uses which must resist impact forces especially at the higher temperatures.

Complementing the uses described earlier in this application the compositions of the invention have been found to have a wide range of uses. The parent application as originally filed disclosed uses on new wooden decking, in steel decking sealing operations, in regrooved seams of wood decking and as calking compound suitable for sealing teak and fir decking with and particularly without the use of a primer, and other uses. Applicants likewise have found that the elastomeric resins of the invention are useful in the strengthening of structural members and especially those as sound barriers and insulation shields. In such and related uses the fluid composition is passed into the contiguous air spaces between the forming and/or supporting members of fabricated materials which may be made, for example, of metallic or non-metallic sheets or plates by well known processes. Such materials may be finished or preconstructed walls, ship hulls, struts, honey comb airplane wing sections, heat shields, and similar articles of commerce, wherein the setting of the fluid composition of the invention to elastomeric resins provide, inter alia, increased strength, resistence to impact, sound deadening and insulation. The fluidity of the initial composition of matter facilitating easy and economical introduction of the resin forming composition into the air spaces which the composition fills and thereafter sets to the elastomeric resinous state.

Moreover, where desired, various fillers may be added to the compositions such, for example as, asbestos, cellulosic fibers as well as filamentitious materials made from Dacron, polyesters, cellulose ester polymers, polyurethanes, polyolefines (straight and branched chain) as well as metallic and plastic mono-crystals including oriented and non-oriented filaments and so-called whiskers. The fillers may be used to regulate the viscosity of the initial compositions prior to introduction and to improve and modify the properties of the finished in situ set resin. It is to be understood that the embodiments of the invention presented in the application illustrate without limiting the invention.

We claim:

1. A composition of matter which is during its application life in a fluid phase, adheres directly to metallic and non-metallic surfaces, sets from the fluid phase to an elastomeric resin, solid phase, substantially bubble-free and with a minimum of volumetric shrinkage between the phases, the composition comprising:
   (a) an epoxy compound having an average of more than one 1,2 epoxy group per average molecular weight in 15 to 150 parts by weight per 100 parts by weight of
   (b) a polymerized low molecular weight chloroprene,
   (c) a plasticizer for the composition that is homogeneous therewith and has a boiling point above 250° F. in sufficient amounts to give a pourable viscosity in the fluid phase, and
   (d) an ambient temperature reacting chemical hardening agent for the epoxy compound in sufficient amounts to give a rapid cure at that temperature, in which the shrinkage between the volume in the fluid and the solid phases is less than 5 percent.

2. The composition of claim 1, in which the plasticizer is selected from the group consisting of dialkyl dicarboxylates, normally liquid petroleum hydrocarbons, chlorinated hydrocarbons, cumar, polyalkyl and alkoxyalkyl phosphates, tri-(methylhexyl) phosphate, dibutyl phthalate and di-2-ethyl hexyl adipate.

3. The composition of claim 1, in which the epoxy compound is a glycidyl polyether of a polyhydric alcohol and the chloroprene polymer is a low molecular weight neoprene.

4. The fluid elastomeric composition of claim 1, in which the chloroprene polymer is a neoprene having a cps. at 122 F. (Brookfield) of 400,000 to 800,000 and a fluidity of 15,000 to 25, cps. at 67° F. (Brookfield).

5. A multilayered deck structure of a nautical vessel of the class described, having an upper deck superimposed on a supporting deck, so constructed and arranged that the resiliency, durability, weatherability to sea water and gasoline, and oil tightness of the decks, when subjected to extensive flexture, are secured by an intermediately disposed layer, in the otherwise void spaces between the decks, comprising a tough contiguous elastomeric resin layer, chemically set in situ with substantially no shrinkage, formed of and contained from 5 parts by weight to 150 parts by weight of a polyepoxide resin per 100 parts by weight of a chloroprene polymer, a hardener for the polyepoxide resin and 15% to 50% of a plasticizer having a boiling point above 250° F. based on the weight of elastomeric resin.

6. The deck structure of claim 5 in which the enclosed intermediate layer is an elastomeric resin having a tensile strength between 700 and 1200 p.s.i. an elongation between 50% and 250% and a Durometer hardness between 20 and 85 formed by the hardening of the chloroprene and epoxy resins.

7. The deck structure of claim 5 in which the resilient upper deck layer is of wood and the supporting layer is of steel.

8. The deck structure of claim 5 in which the polyepoxide and the chloroprene of the elastomeric resin are respectively glycidyl polyether of a polyhydric alcohol and a neoprene.

9. The deck structure of claim 5 in which the polyepoxide and the chloroprene of the elastomeric resin are respectively an epichlorhydrin bisphenol reaction product and an intermediate molecular weight chloroprene polymer (800,000 to 1,200,000 cps. at 122° F. (Brookfield)).

10. A multilayered resilient durable impact resisting surface adapted and arranged for landing aircraft having a resilient upper layer on a structural supporting layer and a tough contiguous elastomeric resin inner layer chemically set in situ comprising 50 parts by weight to 150 parts by weight of a polyepoxide resin per 100 parts by weight of a chloroprene polymer, a hardener for the polyepoxide resin an 15% to 50% of a plasticizer having a boiling point above 250° F. based on the weight of elastomeric resin.

11. In a method of sealing a permeable, layered deck of a nautical vessel and converting it to a resilient, durable, weather-tight multilayered deck structure in contiguous association that is adapted and arranged to withstand heavy loads, the steps which comprise inserting between an upper layer and a structural layer of a permeable deck structure a liquified composition having a viscosity between 19,000 and 15,000 cps. at 25° C. (Brookfield), containing a chloroprene having a cps. of 400,000 to 1,500,000 at 122° F. (Brookfield) and from 50 parts by weight to 150 parts by weight of a polyepoxide resin per 100 parts by weight of the chloroprene polymer, a hardener for the polyepoxide resin and 15% to 50% of a plasticizer having a boiling point above 250° F. based on the weight of the elastomeric resin and setting the composition in situ.

References Cited

UNITED STATES PATENTS

| | | | |
|---|---|---|---|
| 2,860,120 | 11/1958 | Pritchard et al. | 260—837 |
| 3,124,548 | 3/1964 | Yoroch | 260—837 |

FOREIGN PATENTS

| | | | |
|---|---|---|---|
| 815,191 | 6/1959 | Great Britain | 114—85 |
| 017,461 | 1/1965 | East Germany | 114—86 |

R. F. BURNETT, Primary Examiner

L. M. CARLIN, Assistant Examiner

U.S. Cl. X.R.

161—186; 156—330; 260—837; 114—85, 86; 264—261

UNITED STATES PATENT OFFICE
CERTIFICATE OF CORRECTION

Patent No. 3,565,748　　　　　　　　　　Dated February 23, 1971

Inventor(s) Stephen T. Palmer et al.

It is certified that error appears in the above-identified patent and that said Letters Patent are hereby corrected as shown below:

Column 9, line 43, "25" should read -- 25,000 --; line 54, "5" should read -- 50 --.

Signed and sealed this 20th day of July 1971.

(SEAL)
Attest:

EDWARD M. FLETCHER, JR.　　　　　　WILLIAM E. SCHUYLER, JR.
Attesting Officer　　　　　　　　　　Commissioner of Patents